(12) United States Patent
Keen et al.

(10) Patent No.: US 11,549,819 B2
(45) Date of Patent: Jan. 10, 2023

(54) NAVIGATION GUIDANCE USING TACTILE FEEDBACK IMPLEMENTED BY A MICROFLUIDIC LAYER WITHIN A USER DEVICE

(71) Applicant: INTERNATIONAL BUSINESS MACHINES CORPORATION, Armonk, NY (US)

(72) Inventors: Martin G. Keen, Cary, NC (US);
Sarbajit K. Rakshit, Kolkata (IN);
John M. Ganci, Jr., Cary, NC (US);
James E. Bostick, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 265 days.

(21) Appl. No.: 15/992,726

(22) Filed: May 30, 2018

(65) Prior Publication Data

US 2019/0368890 A1 Dec. 5, 2019

(51) Int. Cl.
*G01C 21/36* (2006.01)
*G01C 21/20* (2006.01)
*G06Q 20/12* (2012.01)

(52) U.S. Cl.
CPC ......... *G01C 21/3635* (2013.01); *G01C 21/20* (2013.01); *G06Q 20/127* (2013.01)

(58) Field of Classification Search
CPC ................ G01C 21/3635; A61H 2003/063
See application file for complete search history.

(56) References Cited

U.S. PATENT DOCUMENTS

| | | | | |
|---|---|---|---|---|
| 6,320,496 B1* | 11/2001 | Sokoler | ................... | G06F 3/016 340/407.1 |
| 6,502,032 B1* | 12/2002 | Newman | ............... | G09B 21/003 345/156 |
| 9,360,335 B1* | 6/2016 | Powelson | .......... | G01C 21/3415 |
| 2003/0179133 A1 | 9/2003 | Pepin et al. | | |
| 2008/0120029 A1* | 5/2008 | Zelek | ...................... | G01C 21/20 701/469 |
| 2008/0228393 A1* | 9/2008 | Geelen | ............... | G01C 21/3638 701/532 |
| 2009/0220923 A1* | 9/2009 | Smith | .................. | G09B 21/003 434/113 |
| 2010/0171720 A1* | 7/2010 | Craig | .................... | G06F 3/0202 345/173 |

(Continued)

FOREIGN PATENT DOCUMENTS

CN 107402018 11/2017

OTHER PUBLICATIONS

Velazquez et.al., An Outdoor Navigation System for Blind Pedestrians Using GPS and Tactile-Foot Feedback, Published: Apr. 7, 2018 (Year: 2018).*

(Continued)

*Primary Examiner* — Christian Chace
*Assistant Examiner* — Scott R Jagolinzer
(74) *Attorney, Agent, or Firm* — Anthony England; Andrew D. Wright; Calderon Safran & Cole, P.C.

(57) ABSTRACT

A computer-implemented method includes: obtaining, by a user device, information defining a navigation path to a destination; and forming, by the user device, protrusions on a display of the user device, wherein a pattern of the protrusions corresponds to the navigation path.

20 Claims, 10 Drawing Sheets

(56) References Cited

U.S. PATENT DOCUMENTS

| | | | | |
|---|---|---|---|---|
| 2010/0268463 | A1* | 10/2010 | Kurtti | G01C 21/3679 |
| | | | | 701/469 |
| 2011/0046878 | A1* | 2/2011 | Sung | G01C 21/26 |
| | | | | 701/467 |
| 2013/0044100 | A1* | 2/2013 | King | G06F 3/016 |
| | | | | 345/419 |
| 2013/0218456 | A1* | 8/2013 | Zelek | G01C 21/20 |
| | | | | 701/412 |
| 2014/0002336 | A1* | 1/2014 | Kaine | G06F 3/014 |
| | | | | 345/156 |
| 2014/0132532 | A1* | 5/2014 | Yairi | G06F 3/041 |
| | | | | 345/173 |
| 2015/0293591 | A1* | 10/2015 | Yairi | G06F 3/0416 |
| | | | | 345/173 |
| 2016/0202761 | A1 | 7/2016 | Bostick et al. | |
| 2016/0284235 | A1* | 9/2016 | Zhang | G01S 11/12 |
| 2017/0024010 | A1* | 1/2017 | Weinraub | G01C 21/20 |
| 2017/0068318 | A1* | 3/2017 | McClure | G06F 3/016 |
| 2017/0371415 | A1* | 12/2017 | Cohen | G06F 3/016 |
| 2018/0189567 | A1* | 7/2018 | Maheriya | G06K 9/00214 |
| 2019/0234740 | A1* | 8/2019 | Gabbay | G01C 21/3652 |

OTHER PUBLICATIONS

Ivanov, Algorithm for blind navigation along a GPS track, Conference Paper • Jun. 2011 (Year: 2011).*

SiriusXM, siriusxm.com/infotainment, Capture from Dec. 31, 2014 (Year: 2014).*

Schmeiduch, Blind Maps: Concept for a Braille Interface—Navigation System for the iPhone, Jan. 23, 2012, Youtube (Year: 2012).*

Schirmer et. al., Shoe me the Way: A Shoe-Based Tactile Interface for Eyes-Free Urban Navigation, Aug. 24-27, 2015, MobileHCI (Year: 2015).*

Xu, Tactile Display for the Visually Impaired Using TeslaTouch, May 7-12, 2011, CHI 2011, pp. 317-322 (Year: 2011).*

Jung et. al., PinPad: Touchpad Interaction with Fast and High-Resolution Tactile Output, May 6-11, 2017, CHI 2017, pp. 2416-2425 (Year: 2017).*

Rumelin et. al., NaviRadar: A Tactile Information Display for Pedestrian Navigation, Oct. 16-19, 2011, UIST 2011, pp. 293-302 (Year: 2011).*

Google Maps, Directions and navigation with the new Google Maps app, Jul. 10, 2013, Youtube, https://www.youtube.com/watch?v=mUR08cdlhTQ (Year: 2013).*

Pielot et.al., PocketNavigator: studying tactile navigation systems in-situ, May 2012, CHI '12: Proceedings of the SIGCHI Conference on Human Factors in Computing Systems, pp. 3131-3140 (Year: 2012).*

Johnston, "Microfluidics panel could add physical buttons to a touch screen", https://arstechnica.com/gadgets/2014/01/new-microfluidics-panel-could-add-physical-buttons-to-a-touch-screen/, Jan. 23, 2014; 2 pages.

Mell et al., "The NIST Definition of Cloud Computing", NIST, Special Publication 800-145, Sep. 2011, 7 pages.

* cited by examiner

NAVIGATION GUIDANCE USING TACTILE FEEDBACK IMPLEMENTED BY A MICROFLUIDIC LAYER WITHIN A USER DEVICE

BACKGROUND

The present invention generally relates to providing navigation guidance and, more particularly, to providing navigation guidance using tactile feedback implemented by a microfluidic layer within a user device.

Microfluidics refers to both the study of the flow of fluids in the space having a transverse dimension of a micrometer or smaller, and devices that exploit such phenomena. A user device (e.g., a smart phone, tablet, etc.) may include a microfluidic layer that may dynamically raise the position of the user device display. Protrusions are created using the microfluidic layer in which the protrusions can provide tactile feedback to the user.

SUMMARY

In an aspect of the invention, a computer-implemented method includes: obtaining, by a user device, information defining a navigation path to a destination; and forming, by the user device, protrusions on a display of the user device, wherein a pattern of the protrusions corresponds to the navigation path.

In an aspect of the invention, there is a computer program product for providing tactile navigation directions on a user device. The computer program product comprising a computer readable storage medium having program instructions embodied therewith, the program instructions executable by the user device to cause the user device to: generate navigation directions identifying a navigation path; and control a microfluidic layer in the user device to form protrusions on a display of the user device, wherein the protrusions are in a pattern that trace the navigation path.

In an aspect of the invention, a system includes: a central processing unit (CPU), a computer readable memory and a computer readable storage medium associated with a user device; program instructions to form tactile protrusions on the user device based on the position of the user device in relation to a path corresponding to navigation directions. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
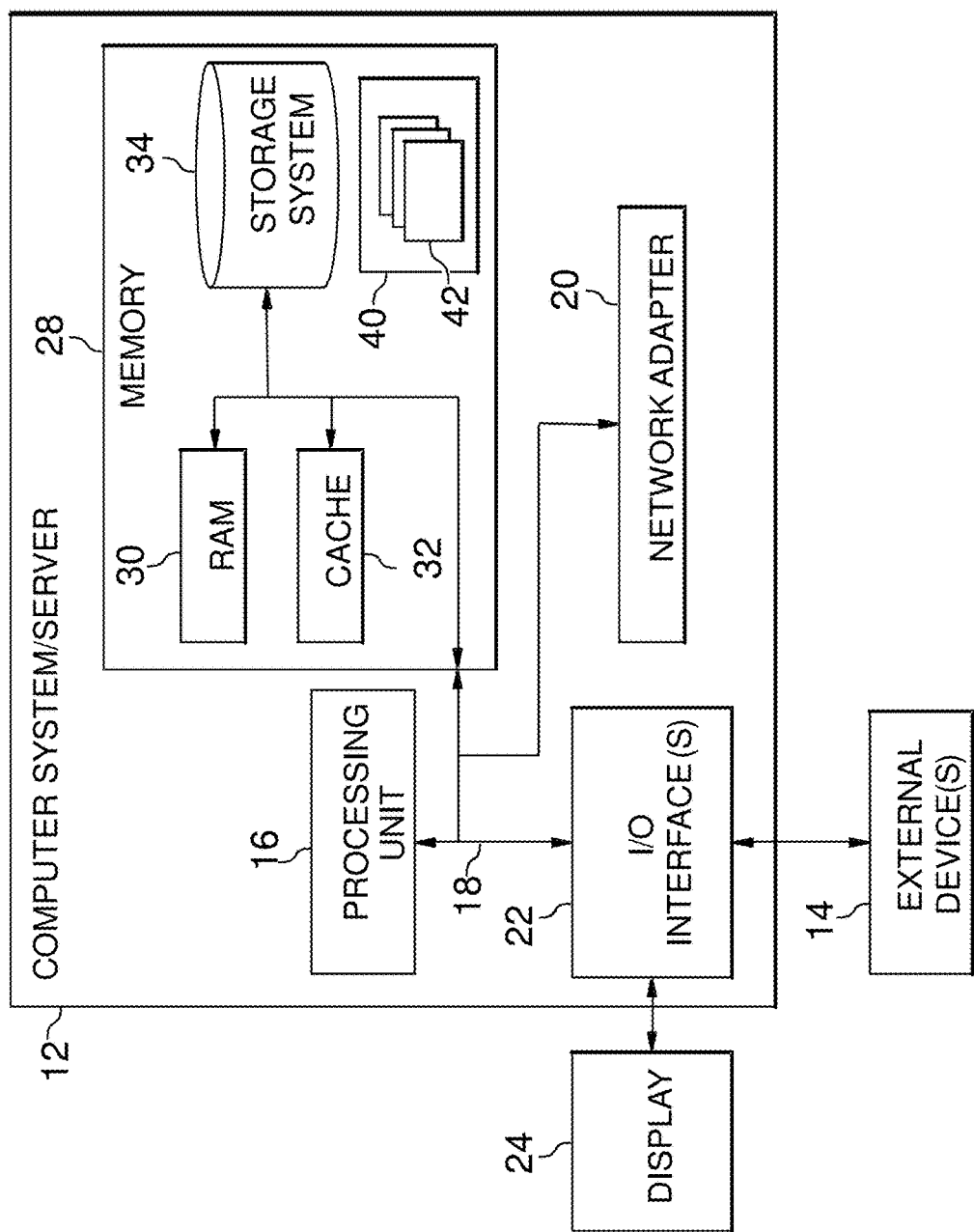
FIG. 1 depicts a cloud computing node according to an embodiment of the present invention.

The present invention generally relates to providing navigation guidance and, more particularly, to providing navigation guidance using tactile feedback implemented by a microfluidic layer within a user device. Aspects of the present invention may include a user device having a microfluidic layer that may dynamically raise a portion of the user device display relative to other portions of the display. Protrusions are created in the display using the microfluidic layer in which the protrusions can provide tactile feedback to the user of the user device. More specifically, in accordance with aspects of the present invention, the microfluidic layer and the protrusions can be controlled based on navigation directions to provide the user (e.g., a visually impaired user) with tactile feedback and aid the user in following a path corresponding to navigation directions when walking. In embodiments, the protrusions may correspond to or trace a walking path determined by navigation directions generated by a navigation application.

As described herein, the microfluidic layer can be controlled to create protrusions on the display in a variety of different patterns based on a walking path corresponding to the navigation directions, the user's actual walking direction, and a deviation between the user's actual walking direction and the walking path defined by the navigation directions. In embodiments, one pattern may represent the correct walking path that is determined based on the navigation directions. Another pattern may represent the user's current walking direction based on a direction that the user is facing (e.g., based on the orientation of the user device). Another pattern may represent the deviation between the user's walking direction and the correct walking path. Further, another pattern may represent the user walking direction matching the correct walking path (e.g., when no deviation or deviation less than a threshold degree exists between the user's walking direction and the correct walking path). In this way, a user (e.g., a visually impaired user) may use tactile feedback provided by the protrusions to determine whether the user is walking on the correct path, and to adjust the user's walking direction accordingly.

While aspects of the present invention are described in terms of providing walking navigation guidance, aspects of the present invention may also be used for providing navigation guidance using other modes of transportation, such as by vehicle. For example, a passenger of an automobile may use the systems described herein to provide driving navigation directions to a driver in which tactical feedback using a microfluidic layer may be used to notify the passenger as to whether the vehicle is on the correct course, and allow the passenger to notify the driver accordingly.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
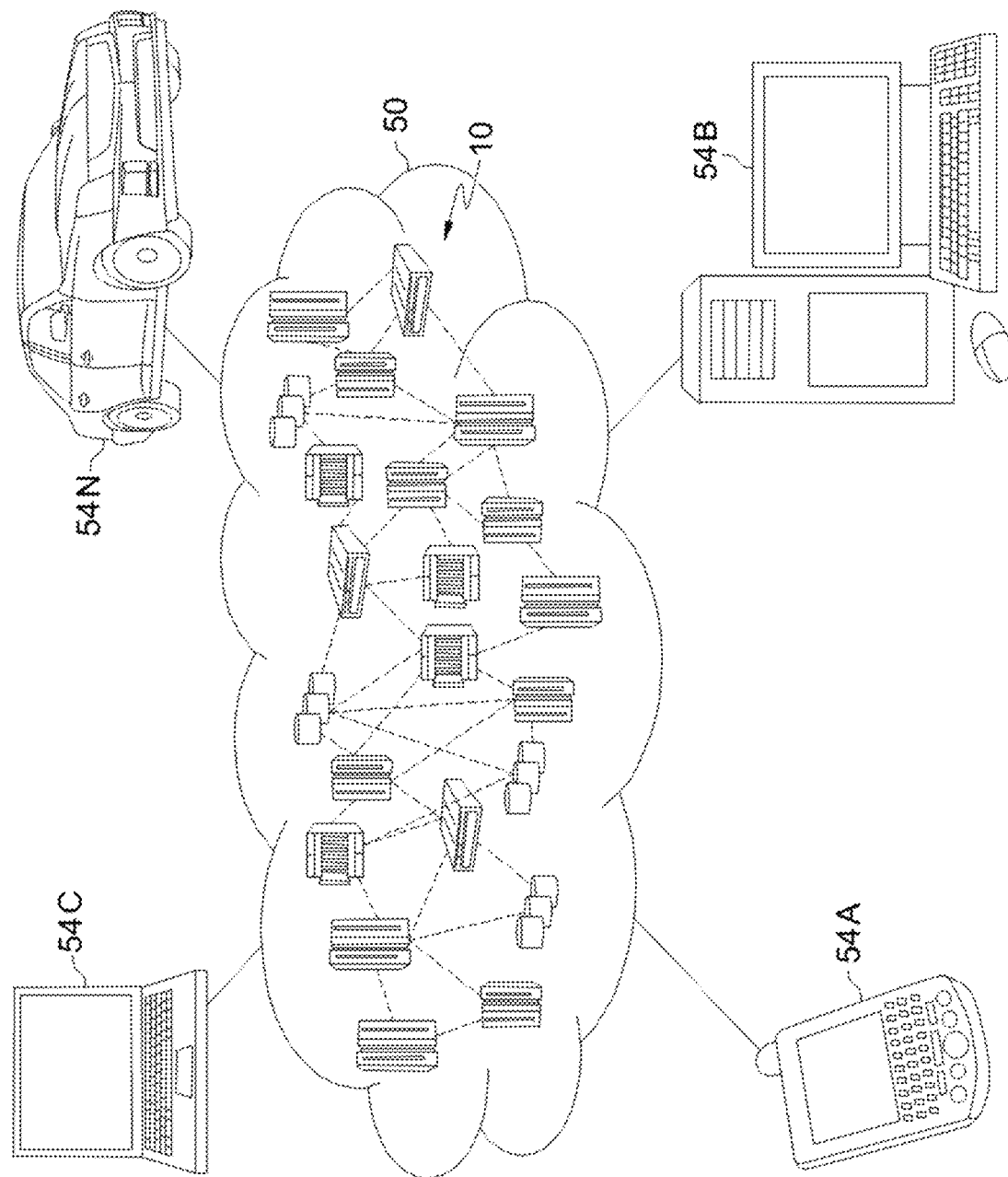
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
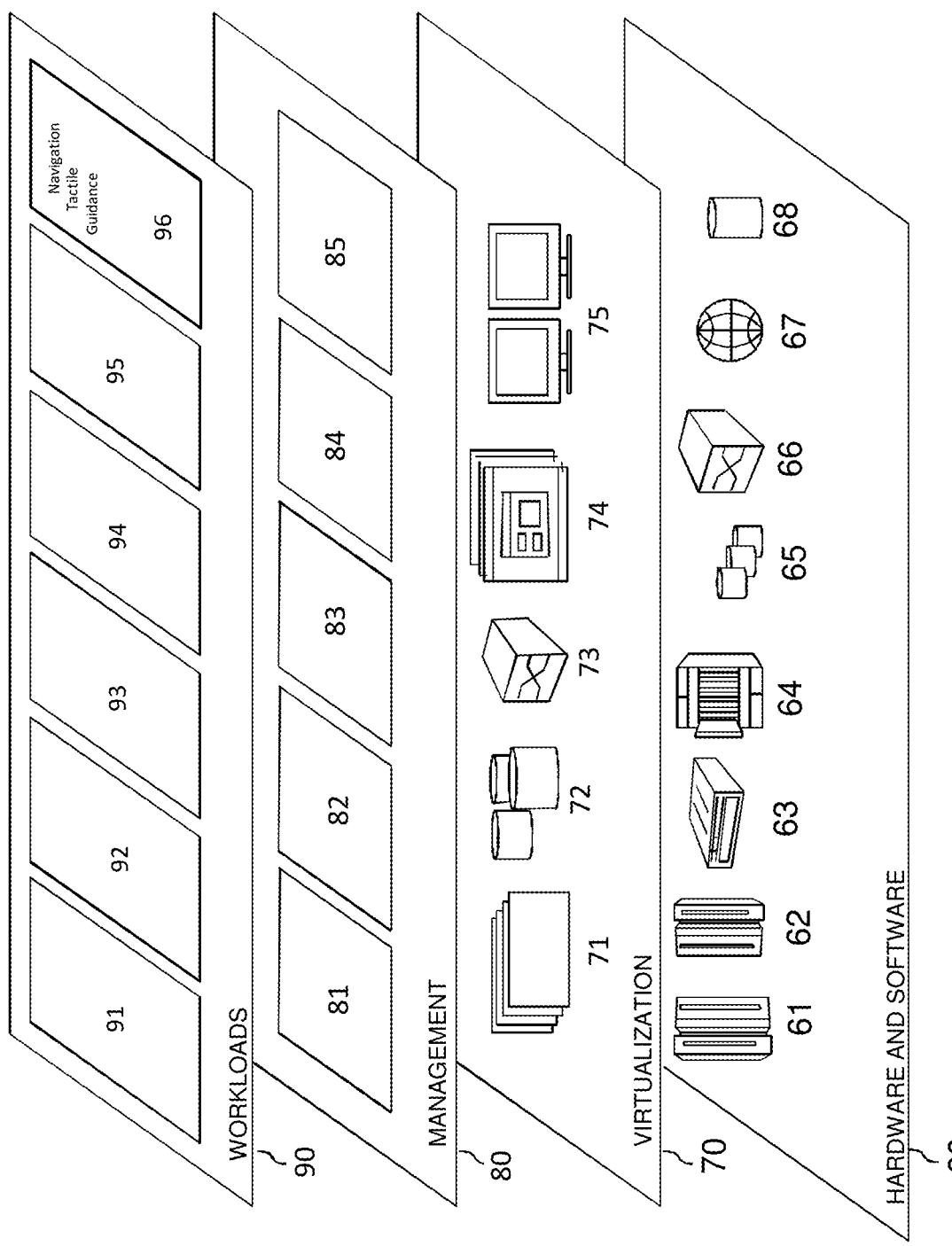
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and navigation tactile guidance 96.

Referring back to FIG. 1, the program/utility 40 may include one or more program modules 42 that generally carry out the functions and/or methodologies of embodiments of the invention as described herein (e.g., such as the functionality provided by navigation tactile guidance 96). Specifically, the program modules 42 may obtain information defining a navigation path to a destination, determine and monitor a user's walking direction, determine and monitor discrepancies between the user's walking direction and the navigation path, and control a microfluidic layer on the user device based on patterns corresponding to the navigation path, user walking direction, and deviation. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of a parking selection server as shown in FIG. 4.

Figure 4A:
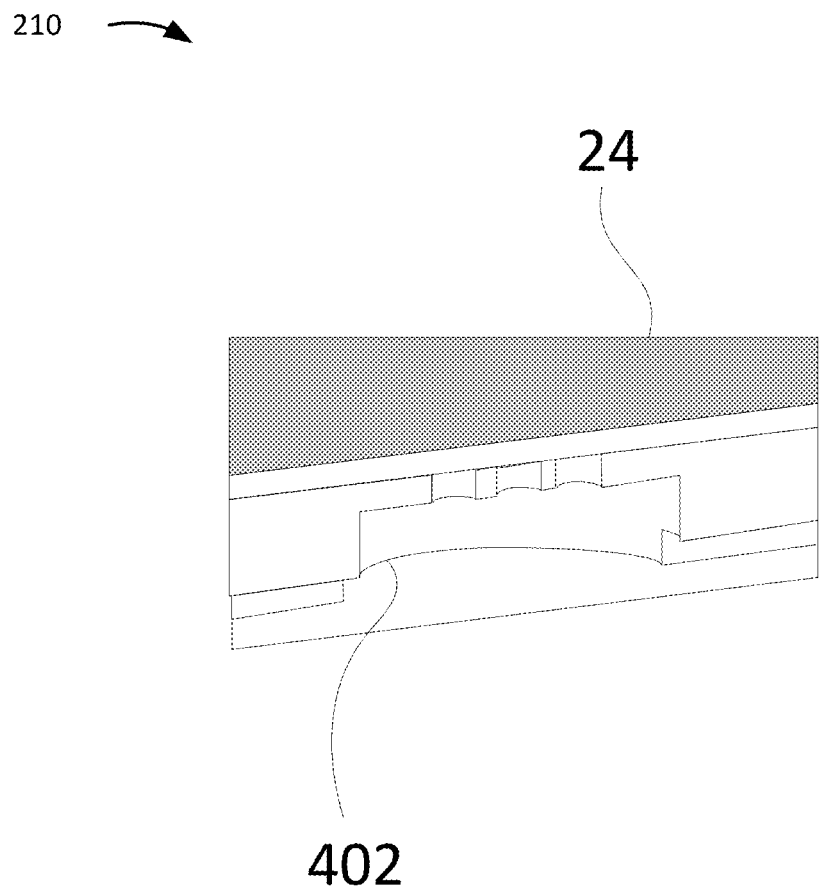
FIGS. 4A-4D show an overview of an example implementation in accordance with aspects of the present invention.
Figure 4B:
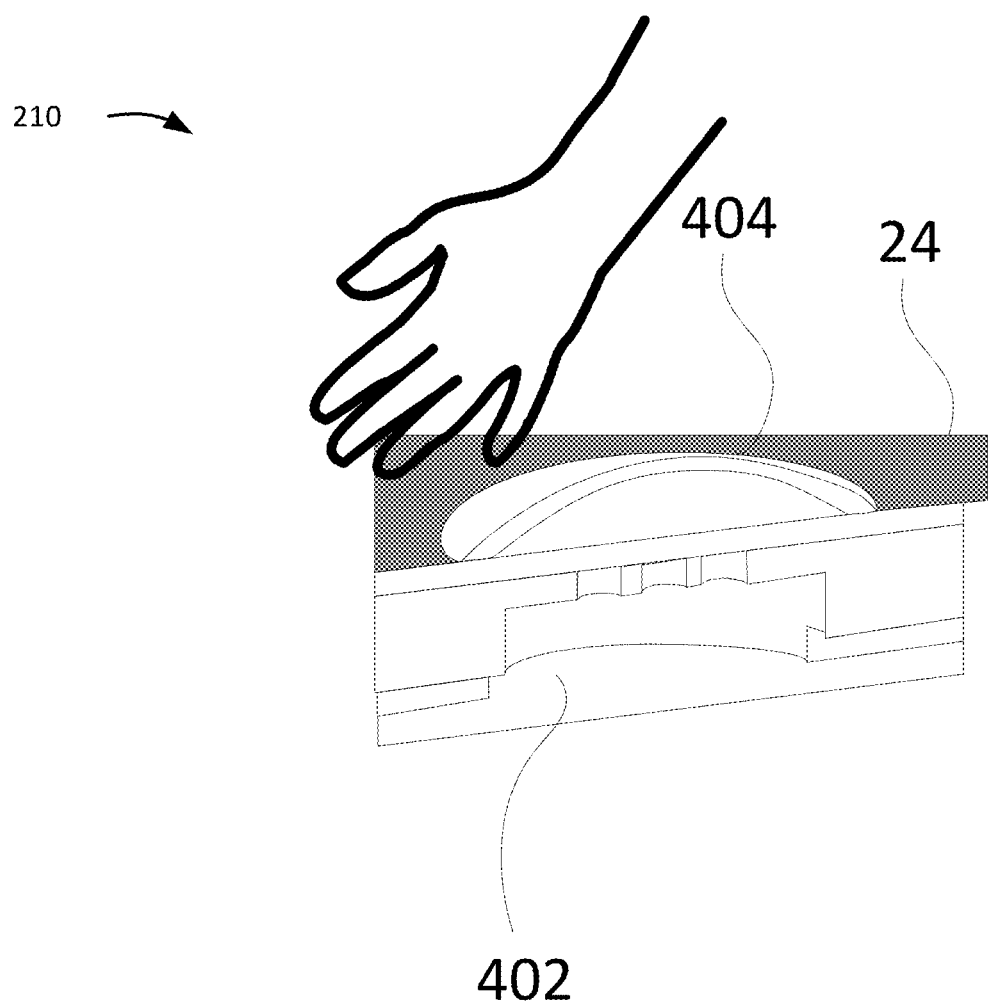

FIGS. 4A-4D show an overview of an example implementation in accordance with aspects of the present invention. In FIG. 4A, example components of a user device 210 are shown. In particular, user device 210 may include a display 24 (e.g., corresponding to display 24 of FIG. 1), and a microfluidic layer 402. The microfluidic layer 402 may include an open space for receiving fluid from a reservoir (not shown). Referring to FIG. 4B, a microfluidics system may selectively pump fluid into respective volumes/spaces under the display 24. In this manner, the microfluidics system may fill the open space with fluid to create a tactile protrusion 404 or bump in the display 24. The arrangement of the components of the microfluidics system (e.g., pump, reservoir, valves, fluid channels, etc.) is unimportant to the practice of the invention other than being capable of selectively pressurizing and depressurizing respective volumes/spaces under the display 24 for the purpose of selectively generating one or more protrusions in the display 24. As described herein, a series of tactile protrusions 404 may be formed on the display 24 in which the pattern of the tactile protrusions 404 conforms to a walking path based on navigation directions to a destination, a user's current walking direction, and/or a deviation between the user's current walking direction and the walking path.

Figure 4C:
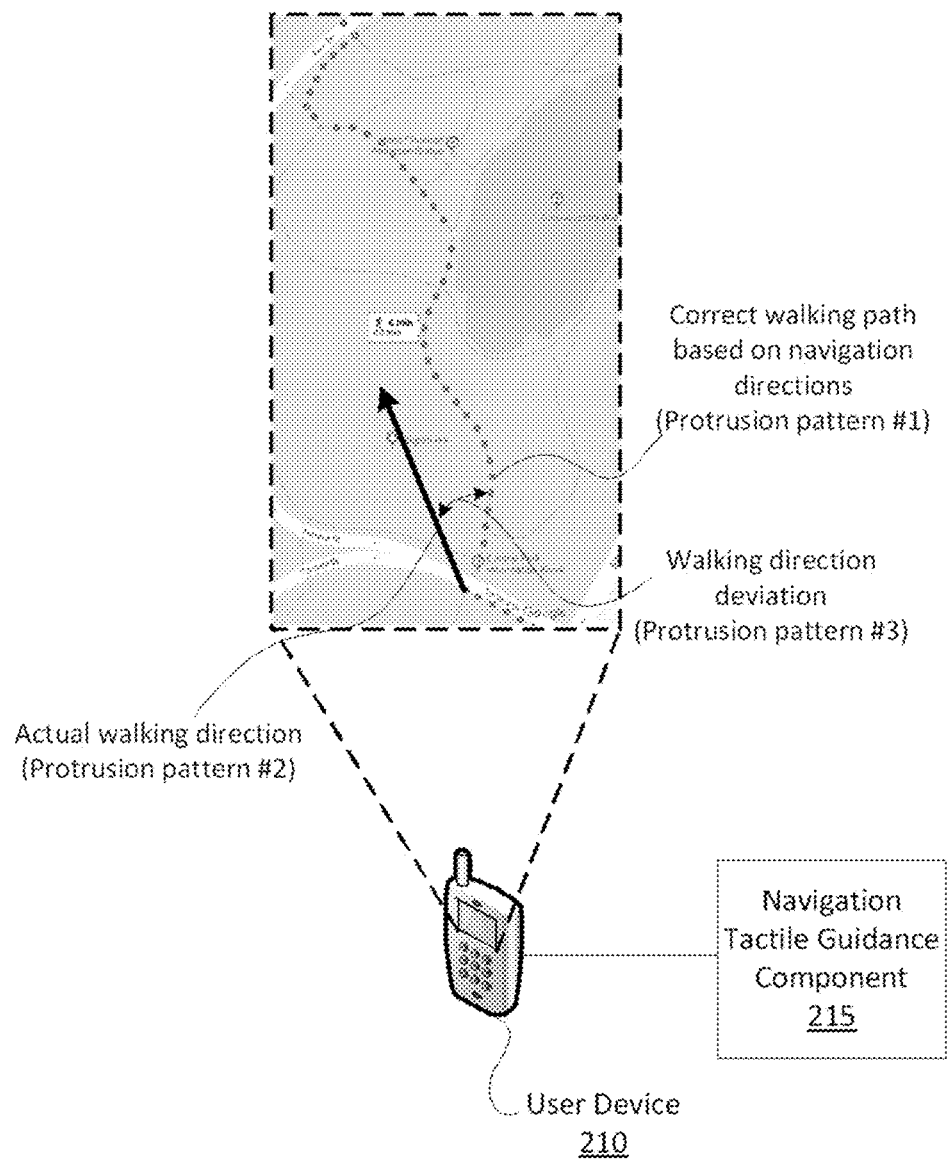

Referring to FIG. 4C, a user device 210 may display a map with a walking path to a destination. The walking path may be determined based on navigation directions provided by a navigation application or service. The user device 210 may also display a walking direction of the user based on an orientation of the user device 210 and one or more sensors (e.g., a compass, gyroscope, etc.) implemented by the user device 210. As described herein, the user device 210 may include a navigation tactile guidance component 215 that controls a microfluidic layer of the user device 210 (e.g., microfluidic layer 402 of FIG. 4A) and generates protrusions (e.g., protrusions 404 of FIG. 4B) by controlling the microfluidic layer. In embodiments, the navigation tactile guidance component 215 may control the microfluidic layer to create different patterns of protrusions on the display of the user device 210. For example, the navigation tactile guidance component 215 may create a pattern of protrusions corresponding to the walking path to the destination (e.g., protrusion pattern #1). That is, the protrusions may trace (e.g., overlay) the walking path that is visually displayed by the display 24. Further, the navigation tactile guidance component 215 may create a pattern of protrusions (e.g., protrusion pattern #2) corresponding to a current walking direction of the user (e.g., based on the orientation of the user device 210). Also, the navigation tactile guidance component 215 may create a pattern of protrusions (e.g., protrusion pattern #3) in an area of the display of the user device 210 corresponding to a deviation between the walking direction and the correct walking path. In this way, the user (e.g., a visually impaired user) may use the tactile protrusions on the display of the user device 210 to determine whether the user is walking in the correct direction, and to adjust their walking direction to match that of the correct walking direction. In embodiments, different patterns of protrusions may include different protrusion shapes, sizes, and distances between protrusions.

Figure 4D:
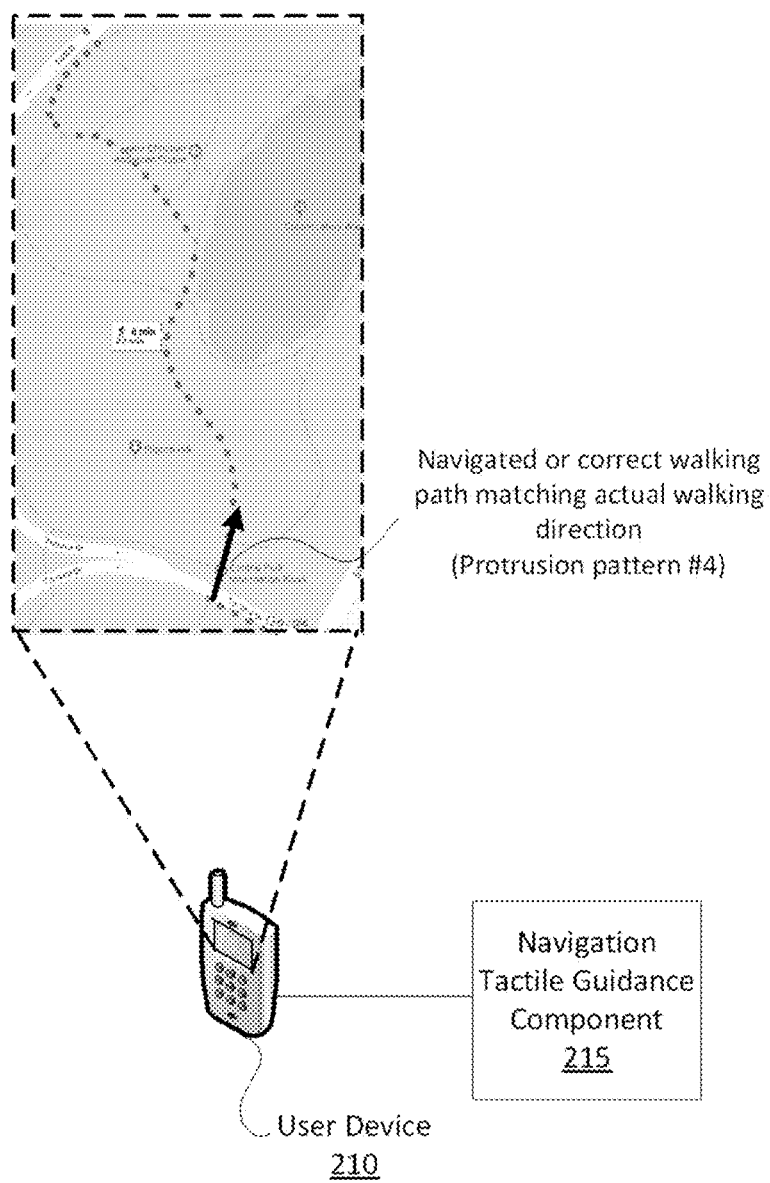

Referring to FIG. 4D, the navigation tactile guidance component 215 may create a pattern of protrusions (e.g., protrusion pattern #4) corresponding to the user's actual walking direction matches the navigated or correct walking path. In this way, the user may receive tactile confirmation that the user is walking in the correct direction. Further, the user may touch the display of the user device 210 to determine the future correct walking path as the direction of the path changes so that the user may be prepared to alter their walking direction to match the navigated or correct walking path. In this way, a visually impaired user may better follow a correct walking path and improve safety by avoiding areas that are outside of a navigated walking path. In embodiments, the user device 210 may also output audible alerts when the user's actual walking path is outside of the navigated or correct walking path.

Figure 5:
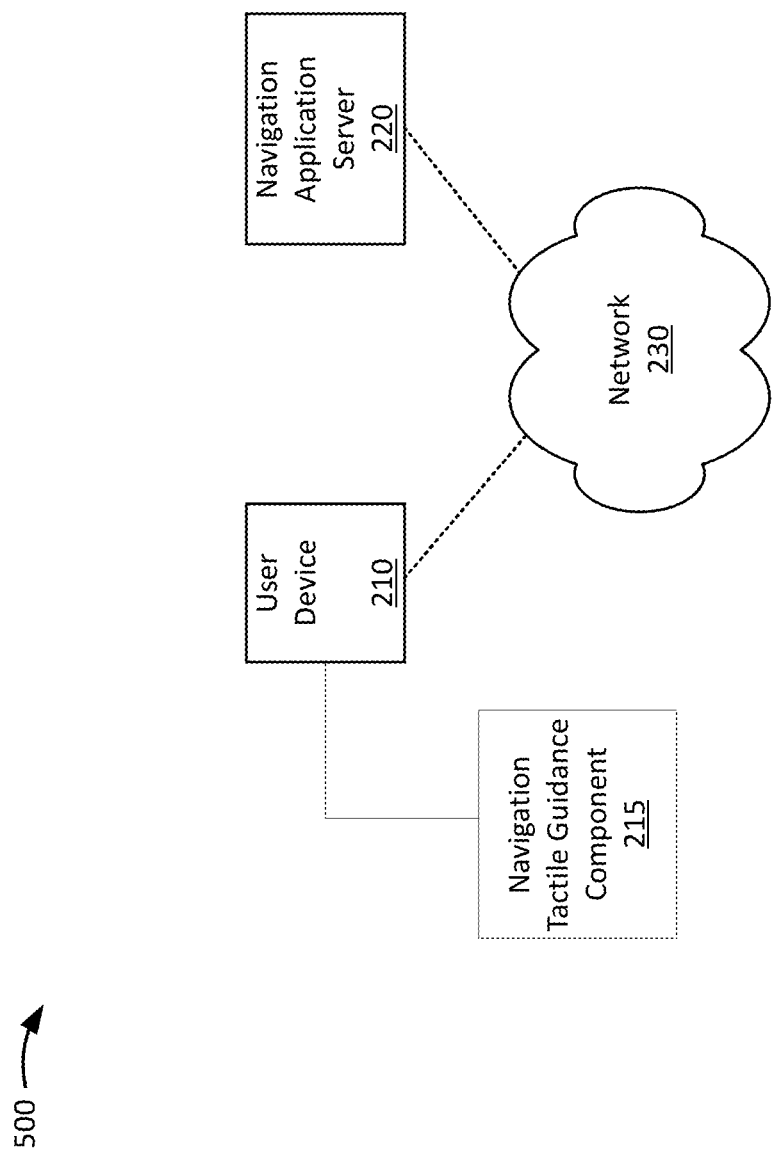
FIG. 5 shows an example environment in accordance with aspects of the present invention.

FIG. 5 shows an example environment in accordance with aspects of the present invention. As shown in FIG. 5, environment 500 may include a user device 210, a navigation application server 220, and a network 230. In embodiments, one or more components in environment 500 may correspond to one or more components in the cloud computing environment of FIG. 2. In embodiments, one or more components in environment 500 may include the components of computer system/server 12 of FIG. 1.

The user device 210 may include a device capable of communicating via a network, such as the network 230. For example, the user device user device 210 may correspond to a mobile communication device (e.g., a smart phone or a personal digital assistant (PDA)), a tablet computer, or another type of computing device. In some embodiments, the user device 210 may include a navigation application to communicate with the navigation application server 220 to obtain navigation directions from an origin (e.g., a current location of the user device 210) to a destination (e.g., as inputted by a user of the user device 210 via a keyboard, voice input, and/or other input technique). The user device 210 may include a navigation tactile guidance component 215 to obtain information defining a navigation path to a destination, determine and monitor a user's walking direction, determine and monitor discrepancies between the user's walking direction and the navigation path, and control a microfluidic layer on the user device based on patterns corresponding to the navigation path, user walking direction, and deviation. In embodiments, the navigation tactile guidance component 215 may include a combination of hardware components (e.g., microfluidic components) and software components (e.g., control components to control the microfluidic layer).

The navigation application server 220 may include one or more computing devices (e.g., such as computer system/server 12 of FIG. 1) that receives a request for navigation directions from the user device 210. For example, the navigation application server 220 may receive information identifying a current location of the user device 210 and a destination. The navigation application server 220 may determine navigation directions from the current location to the destination, and provide the navigation directions to the user device 210.

The network 230 may include network nodes, such as network nodes 10 of FIG. 2. Additionally, or alternatively, the network 230 may include one or more wired and/or wireless networks. For example, the network 230 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 230 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 500 is not limited to what is shown in FIG. 5. In practice, the environment 500 may include additional devices and/or networks; fewer devices and/or networks; different devices and/or networks; or differently arranged devices and/or networks than illustrated in FIG. 5. Devices of the environment 500 may interconnect via wired connections, wireless connections, or a combination of wired and wireless connections. Also, in some implementations, one or more of the devices of the environment 500 may perform one or more functions described as being performed by another one or more of the devices of the environment 500. In particular, the navigation application server 220 may perform one or more of the functions of the navigation tactile guidance component 215. For example, the navigation application server 220 may determine microfluidic control instructions based on navigation directions, and provide the microfluidic control instructions to the navigation tactile guidance component 215 as a service. The navigation tactile guidance component 215 may execute the microfluidic control instructions to produce microfluidic protrusions on the display of the user device 210 corresponding to the navigation instructions.

Figure 6:
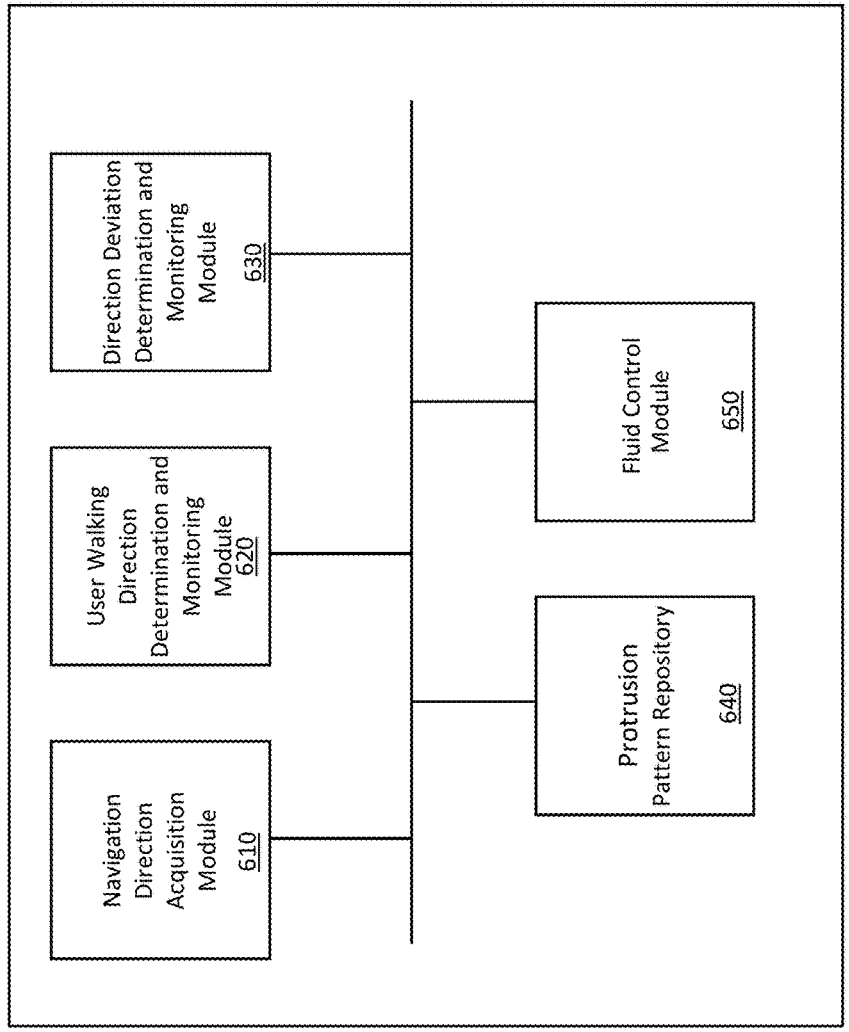
FIG. 6 shows a block diagram of example components of a user device and/or navigation tactile guidance component in accordance with aspects of the present invention.

FIG. 6 shows a block diagram of example components of a user device 210 and/or a navigation tactile guidance component 215 in accordance with aspects of the present invention. As shown in FIG. 6, the user device 210 and/or the navigation tactile guidance component 215 may include a navigation directions acquisition module 610, a user walking direction determination and monitoring module 620, a direction deviation determination and monitoring module 630, a protrusion pattern repository 640, and a fluid control module 650. In embodiments, the user device 210 and/or the navigation tactile guidance component 215 may include additional or fewer components than those shown in FIG. 6. In embodiments, separate components may be integrated into a single computing component or module. Additionally, or alternatively, a single component may be implemented as multiple computing components or modules.

The navigation directions acquisition module 610 may include a program module (e.g., program module 42 of FIG. 1) that obtains navigation directions from an origin to a destination. For example, the navigation directions acquisition module 610 may be associated with a navigation application implemented by the user device 210 and that communicates with the navigation application server 220. The navigation directions acquisition module 610 may receive, via a user interface of the user device 210, an instruction to obtain navigation directions from an origin to a destination. Additionally, or alternatively, the navigation directions acquisition module 610 may obtain re-calculated navigation directions when original navigation directions are not followed (e.g., if a turn is missed, an alternate route is taken, etc.). In embodiments, the user device 210 may display the navigation directions through a map or navigation application.

The user walking direction determination and monitoring module 620 may include a program module (e.g., program module 42 of FIG. 1) that determines a direction that a user is currently walking. For example, the user walking direction determination and monitoring module 620 may receive directional data from a compass implemented within the user device 210. Additionally, or alternatively, the user walking direction determination and monitoring module 620 may determine the user's walking direction based on some other technique (e.g., tracking the user's position as the user walks and determining the user's walking direction based on the user's changing position). The user walking direction determination and monitoring module 620 may continue to monitor the user's walking direction during a navigation operation (e.g., while navigation instructions are being provided by the navigation application).

The direction deviation determination and monitoring module 630 may include a program module (e.g., program module 42 of FIG. 1) that determines a deviation between the user's walking direction and the walking path from the navigated directions (e.g., from the navigation directions acquisition module 610). For example, the direction deviation determination and monitoring module 630 may obtain information regarding the user's walking direction from the user walking direction determination and monitoring module 620 and compare the user's walking direction with the navigation direction (e.g., the correct walking path) obtained by the navigation directions acquisition module 610. The walking direction and the navigation direction may be expressed in degrees (i.e., 0 degrees to 360 degrees) in which 0 degrees corresponds to the north direction. The direction deviation determination and monitoring module 630 may compare the degrees of the walking direction with the degrees of the navigation direction to determine a degree range in which the walking direction deviates from the navigation direction.

The protrusion pattern repository 640 may include a data storage device (e.g., storage system 34 of FIG. 1) that stores information regarding the patterns of protrusions (e.g., tactile protrusions) that may be formed on the user device 210. As described herein, the protrusion pattern repository 640 may store information identifying different protrusion patterns for different sets of data. For example, one protrusion pattern may correspond to a navigation walking path based on navigation directions (e.g., obtained by the navigation directions acquisition module 610). Another protrusion pattern may correspond to a user's current walking direction (e.g., obtained by the user walking direction determination and monitoring module 620). Another protrusion pattern may correspond to a deviation between the user's current walking direction and the navigation walking path (e.g., obtained by the direction deviation determination and monitoring module 630). Another protrusion pattern may correspond to the user's walking direction matching the navigation walking path Additionally, or alternatively, the protrusion pattern repository 640 may store information regarding other protrusion patterns for other data points (e.g., a protrusion pattern for an origin location, a destination location, a current location of the user device 210, etc.). In embodiments, the patterns may be predefined and/or may be user-customizable.

The fluid control module 650 may include a program module (e.g., program module 42 of FIG. 1) that controls a microfluidic layer of the user device 210. More specifically, the fluid control module 650 may control the flow of fluid into the microfluidic layer at different portions within the layer to form protrusions in the patterns defined by the protrusion pattern repository 640. That is, the fluid control module 650 may determine the location on the display of user device 210 to form different protrusion patterns based on the location on the display in which navigation directions are displayed (e.g., obtained by the navigation directions acquisition module 610), the user's current walking direction (e.g., obtained by the user walking direction determination and monitoring module 620), the deviation between the user's current walking direction and the walking path (e.g., obtained by the direction deviation determination and monitoring module 630). The fluid control module 650 may determine the actual protrusion patterns to form at the location of the display based on the information defining the protrusion patterns stored in the protrusion pattern repository 640. As the user's walking direction and direction deviation changes, the fluid control module 650 may accordingly alter the protrusions on the display of the user device 210. Further, as the user approaches a destination, the display of the walking path on the user device 210 may update (e.g., re-center based on the user's position relative to the walking path), and the fluid control module 650 may accordingly alter the protrusions to conform to the walking path displayed on the user device 210. In this way, the fluid control module 650 may generate protrusions on the user device 210 to provide a user (e.g., a visually impaired user) with tactile walking navigation guidance. Further, the fluid control module 650 may receive (e.g., from a navigation application running on the user device 210), an indication that the user has reached their destination. The fluid control module 650 may discontinue forming protrusions accordingly.

Figure 7:
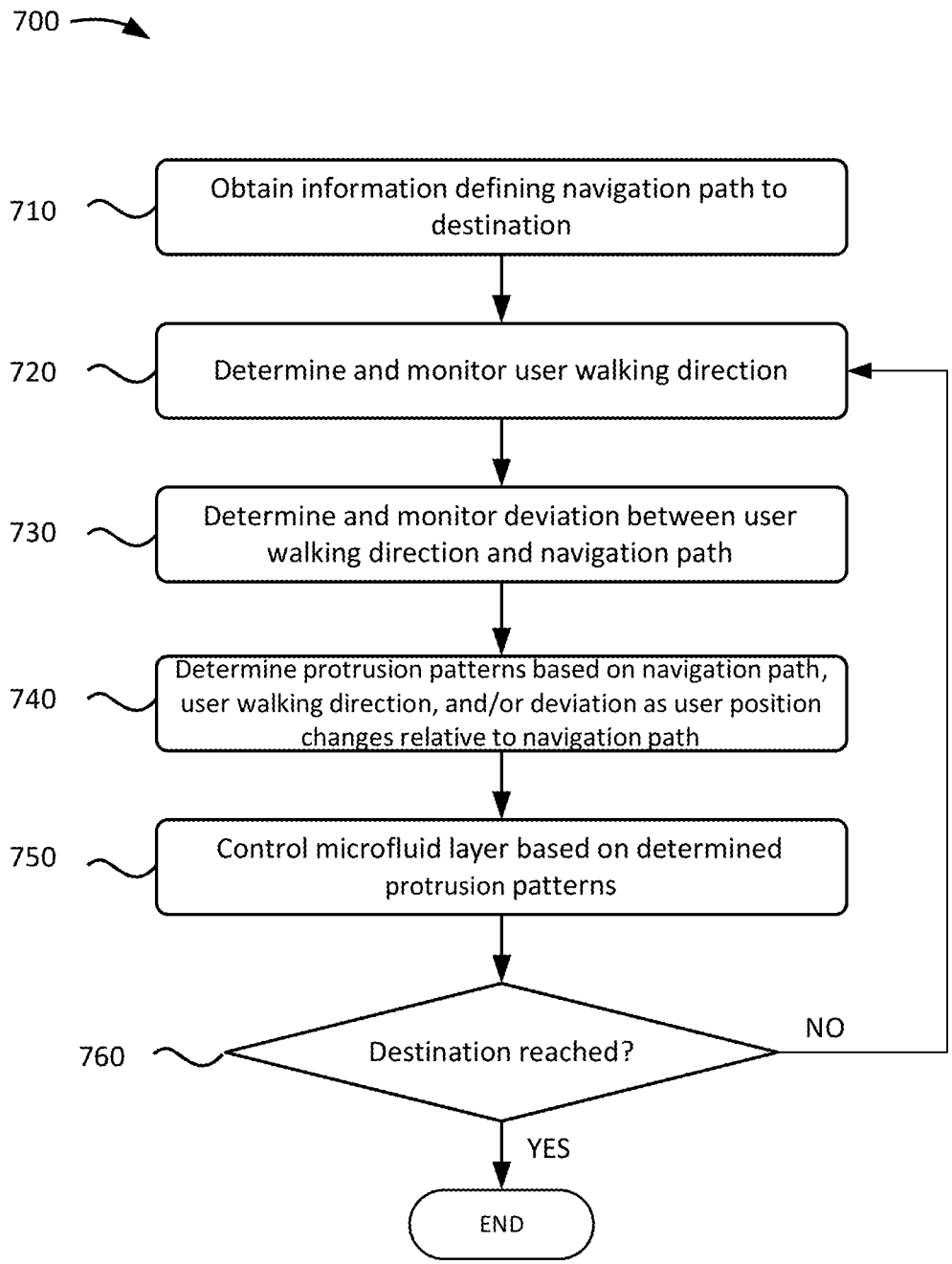
FIG. 7 shows an example flowchart of a process for providing a user with tactile walking navigation directions in accordance with aspects of the present invention.

FIG. 7 shows an example flowchart of a process for providing a user with tactile walking navigation directions. The steps of FIG. 7 may be implemented in the environment of FIG. 5, for example, and are described using reference numbers of elements depicted in FIG. 5. As noted above, the flowchart illustrates the architecture, functionality, and operation of possible implementations of systems, methods, and computer program products according to various embodiments of the present invention.

As shown in FIG. 7, process 700 may include obtaining information defining a navigation path to a destination (step 710). For example, as described above with respect to the navigation directions acquisition module 610, the navigation tactile guidance component 215 may obtain navigation directions from an origin to a destination. For example, the navigation tactile guidance component 215 may receive, via a user interface of the user device 210, an instruction to obtain navigation directions from an origin to a destination. Additionally, or alternatively, the navigation tactile guidance component 215 may obtain re-calculated navigation directions when original navigation directions are not followed (e.g., if a turn is missed, an alternate route is taken, etc.). The navigation directions may define a navigation path (e.g., a walking path) to the destination.

Process 700 may also include determining and monitoring the user's walking direction (step 720). For example, as described above with respect to the user walking direction determination and monitoring module 620, the navigation tactile guidance component 215 may receive directional data from a compass implemented within the user device 210. Additionally, or alternatively, the navigation tactile guidance component 215 may determine the user's walking direction based on some other technique (e.g., tracking the user's position as the user walks and determining the user's walking direction based on the user's changing position). The navigation tactile guidance component 215 may continue to monitor the user's walking direction during a navigation operation (e.g., while navigation instructions are being provided by the navigation application).

Process 700 may further include determining and monitoring a deviation between the user's walking direction and the navigation path (step 730). For example, as described above with respect to the direction deviation determination and monitoring module 630, the navigation tactile guidance component 215 may determine a deviation between the user's walking direction and the walking path from the navigated directions (e.g., from step 710). For example, the navigation tactile guidance component 215 may obtain information regarding the user's walking direction (e.g., from step 720) and compare the user's walking direction with the navigation direction (e.g., the correct walking path).

Process 700 may also include determining protrusion patterns based on the navigation path, the user walking direction, and/or the deviation as the user's position changes relative to the navigation path (step 740). For example, as described above with respect to the protrusion pattern repository 640, the navigation tactile guidance component 215 may determine the protrusion patterns based on information stored by the protrusion pattern repository 640 that defines different protrusion patterns for different sets of tactile navigation data (e.g., one protrusion pattern for navigation path, another pattern for the user's walking direction, another pattern for the deviation between the walking direction and navigation path, etc.).

Process 700 may further include controlling a microfluidic layer based on the determined protrusion patterns (step 750). For example, as described above with respect to the fluid control module 650, the navigation tactile guidance component 215 may control the flow of fluid into the microfluidic layer at different portions within the layer to form protrusions in the patterns defined by the protrusion pattern repository 640. In embodiments, the user device 210 may display the navigation path (e.g., within a navigation application). The navigation tactile guidance component 215 may form the protrusions (in the defined pattern) on the display of the user device 210 to correspond to or trace the navigation path that is displayed on the user device 210.

Process 700 may also include determining whether the destination has been reached (step 760). For example, as described above with respect to the fluid control module 650, the navigation tactile guidance component 215 may receive (e.g., from a navigation application running on the user device 210), an indication that the user has reached their destination. If, at step 760, the user not yet reached their destination (step 760—NO), process 700 may return to step 720. If at step 760, the user has reached their destination (step 760—YES), process 700 may end and the navigation tactile guidance component 215 may discontinue forming protrusions on the user device 210. In this way, the navigation tactile guidance component 215 may continue to monitor the user' walking direction, deviation between the walking direction and navigation path, and update the protrusions on the user device 210 to continue to provide tactile navigation guidance until the user has reached their destination. For example, the navigation tactile guidance component 215 may update the protrusions on the user device 210 as the user's position and walking direction changes relative to the navigation path. In embodiments, the user device 210 may also provide audible alerts that indicate a deviation between the user's walking path and the navigation path and may provide audible confirmation when the user's walking path matches the navigation path (e.g., when the deviation is less than a threshold amount).

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   obtaining, by a user device, information defining a navigation path to a destination wherein the navigation path directs a user of the user device toward the destination along a walking path that is visually displayed as a map on a display of the user device;
   forming, by the user device, protrusions on the display of the user device, wherein a first pattern of the protrusions corresponds to the navigation path;
   determining, by the user device, a walking direction of an actual path taken by the user of the user device;
   forming, by the user device, a second pattern of protrusions on the display of the user device, wherein the second pattern of protrusions corresponds to the walking direction of the user;
   determining, by the user device, that a deviation between the walking direction and the navigation path is less than a threshold;
   as a result of the walking direction being along the navigation path, forming, by the user device, a third pattern of protrusions overlaid with the walking path on the display of the user device, wherein the third pattern of protrusions corresponds to the walking direction and the navigation path, indicating that the walking direction is along the navigation path; and
   a first protrusion of the protrusions of the third pattern of protrusions is tactilely different from a first protrusion of the protrusions of the first pattern of protrusions, wherein the tactile difference includes a difference selected from a group including different shapes and different sizes,
   wherein the first pattern of protrusions and the second pattern of protrusions are formed simultaneously on the display of the user device.

2. The method of claim 1, wherein the forming the protrusions includes controlling a flow of fluid within a microfluidic layer of the user device.

3. The method of claim 1, further comprising:
   forming, by the user device, a fourth pattern of protrusions on the display of the user device, wherein the fourth pattern of protrusions corresponds to the deviation between the walking direction and the navigation path.

4. The method of claim 3, further comprising:
   monitoring, by the user device, a position of the user and the walking direction of the user; and
   updating, by the user device, each of the first pattern of protrusions, the second pattern of protrusions, the third pattern of protrusions, and the fourth pattern of protrusions based on changes in the position and walking direction of the user.

5. The method of claim 1, further comprising discontinuing the forming the protrusions when the position of the user device has reached the destination.

6. The method of claim 1, wherein the user device includes software provided as a service in a cloud environment.

7. The method of claim 1, further comprising deploying a system for providing tactile navigation directions, comprising providing a computer infrastructure implemented by the user device operable to perform the obtaining the information defining the navigation path, and the forming the protrusions on the display.

8. The method of claim 1, wherein the protrusions of the first pattern of protrusions are a first shape, the protrusions of the second pattern of protrusions are a second shape, and the first shape and the second shape are different shapes.

9. The method of claim 1, wherein the protrusions of the first pattern of protrusions are a first size, the protrusions of the second pattern of protrusions are a second size, and the first size and the second size are different sizes.

10. The method of claim 1, wherein the protrusions of the first pattern of protrusions are spaced apart from each other a first distance, the protrusions of the second pattern of protrusions are spaced apart from each other a second distance, and the first distance and the second distance are different distances.

11. The method of claim 1, further comprising re-centering the display of the walking path on the user device based on the user's position relative to the walking path.

12. The method of claim 1, wherein the first pattern comprises dotted line that follows the navigation path, the second pattern comprises an arrow in the walking direction, and the third pattern comprises another arrow.

13. A computer program product for providing tactile navigation directions on a user device, the computer program product comprising a computer readable storage medium having program instructions embodied therewith, the program instructions executable by the user device to cause the user device to:

generate navigation directions identifying a navigation path, wherein the navigation path directs a user of the user device toward the destination along a walking path that is visually displayed as a map on a display of the user device;
control a microfluidic layer in the user device to form protrusions on the display of the user device, wherein the protrusions are in a first pattern of protrusions that trace the navigation path;
determine a movement direction of an actual path taken by the user of the user device;
form a second pattern of protrusions on the display of the user device, wherein the second pattern of protrusions corresponds to the movement direction;
determine that a deviation between the movement direction and the navigation path is less than a threshold;
form a third pattern of protrusions on the display of the user device, wherein the third pattern of protrusions corresponds to the deviation between the movement direction and the navigation path; and
a first protrusion of the protrusions of the third pattern of protrusions is tactilely different from a first protrusion of the protrusions of the first pattern of protrusions, wherein the tactile difference between the first protrusion of the first pattern and the first protrusion of the third pattern includes a difference selected from a group including different shapes and different sizes,
wherein the first pattern of protrusions and the second pattern of protrusions are formed simultaneously on the display of the user device and the first pattern of protrusions overlays a visually displayed navigation path.

14. The computer program product of claim 13, wherein the protrusions are tactile protrusions.

15. The computer program product of claim 13, wherein the program instructions further cause the user device to:
form a fourth pattern of protrusions on the display of the user device, wherein the fourth pattern of protrusions corresponds to the movement direction and the navigation path, indicating that the movement direction is along the navigation path.

16. The computer program product of claim 15, wherein the program instructions further cause the user device to:
monitor a position of the user device and the movement direction; and
update each of the first pattern of protrusions, the second pattern of protrusions, the third pattern of protrusions, and the fourth pattern of protrusions based on changes in the position and movement direction.

17. A system comprising:
a central processing unit (CPU), a computer readable memory and a computer readable storage medium associated with a user device;
program instructions to form tactile protrusions on the user device based on a position of the user device in relation to a navigation path corresponding to navigation directions, a first pattern of the protrusions corresponding to the navigation path, wherein the navigation path directs a user of the user device toward the destination along a walking path that is visually displayed as a map on a display of the user device,
program instructions to determine a movement direction of an actual path taken by the user of the user device;
program instructions to form a second pattern of protrusions on the display of the user device, wherein the second pattern of protrusions corresponds to the movement direction;
program instructions to determine that a deviation between the movement direction and the navigation path is less than a threshold; and
program instructions to form, as a result of the walking direction being along the navigation path when the deviation is less than the threshold, a third pattern of protrusions on the display of the user device, wherein the third pattern of protrusions corresponds to the movement direction and the navigation path, indicating that the movement direction is along the navigation path, and when the deviation is more than the threshold forming the third pattern of the deviation, the second pattern of the movement direction, and the first pattern of the navigation path simultaneously on the display of the user device,
wherein the protrusions of the second pattern of protrusions and the protrusions of the first pattern of protrusions are formed simultaneously on the display of the user device and the first pattern of protrusions overlays a visually displayed navigation path,
a first protrusion of the protrusions of the third pattern of protrusions is tactilely different from a first protrusion of the protrusions of the first pattern of protrusions, wherein the tactile difference between the first protrusion of the first pattern and the first protrusion of the third pattern includes a difference selected from a group including different shapes and different sizes, and
the program instructions are stored on the computer readable storage medium for execution by the CPU via the computer readable memory.

18. The system of claim 17, further comprising program instructions to discontinue the forming the tactile protrusions when the position of the user device has reached a destination.

19. The system of claim 17, further comprising program instructions to form a fourth pattern of protrusions on the display of the user device, wherein the fourth pattern of protrusions corresponds to the deviation between the movement direction and the navigation path.

20. The system of claim 17, wherein the protrusions of the first pattern of protrusions are a first shape, the protrusions of the second pattern of protrusions are a second shape, and the first shape and the second shape are different shapes.

* * * * *